Patented Oct. 10, 1950

2,525,223

UNITED STATES PATENT OFFICE 2,525,223

PREPARATION OF N-SUBSTITUTED PIPERAZINES

Kenneth L. Howard, Westfield, N. J., assignor to American Cyanamid Company, New York, N. Y., a corporation of Maine No Drawing. Application May 25, 1948, Serial No. 29,195

7 Claims. (Cl. 260—268)

This invention relates to the production of N-alkyl piperazines. More particularly, the invention relates to the production of mono-N-alkyl piperazines by the condensation of a dialkanol amine and an alkyl amine.

It is well known in the prior art that the direct alkylation of piperazine to produce the lower alkyl piperazines produces a mixture of substitution products, including N,N'-dialkylpiperazines and their quaternary salts, and the isolation of mono-substituted compounds from such mixtures is in many cases difficult or impossible. In the past mono-N-alkyl piperazines have been obtained by alkylation of N-phenyl piperazine followed by removal of the phenyl group after nitrosation by hydrolysis, further by alkylation of N-benzyl piperazine and removal of the benzyl group by means of reductive cleavage, still further by alkylation of N-acyl piperazines and removal of the acyl group by hydrolysis in concentrated acid. All of these methods have the disadvantage of requiring the blocking of one nitrogen atom of the piperazine before alkylation and the subsequent removal of the blocking group. This is a two step process which is time consuming and gives lower overall yields.

I have now found that mono-N-alkyl piperazines can be obtained byt he condensation of diethanolamine or C-alkyl derivatives thereof with a primary alkyl amine. The reaction which is thought to take place can be illustrated by the following equation:

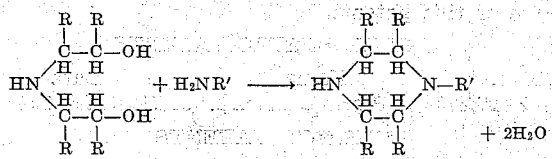

in which R is hydrogen or an alkyl radical and R' is an alkyl radical.

According to the present invention this reaction is carried out in the presence of suitable catalysts. In general the process of the present invention comprises reacting diethanolamine or C-alkyl derivatives thereof with a primary alkyl amine in the presence of a catalyst at an elevated temperature and isolating the desired mono-N-alkyl piperazine from the reaction mixture.

Aliphatic dihydroxy amines are particularly advantageous as starting materials. Among those which may be used in the present process are the following: diethanolamine; 2-hydroxypropyl ethanol amine; di(2-hydroxypropyl)amine and the like.

The primary amines found useful in the present process are alkyl amines such as methylamine, ethylamine, propylamine, isopropylamine, butylamine, isobutylamine, amylamine, etc.

The process of the present invention is carried out in the presence of dehydration catalysts. Among the most satisfactory are alumina-nickel and Raney nickel. Other catalysts such as alumina-silica gel, and the like can be used. It is usually preferable to use a single catalyst in carrying out a particular reaction although more than one can be used if desired.

The present process is relatively simple and can be carried out in apparatus wherein the intermediates and catalyst are agitated at an elevated temperature for a sufficient length of time to complete the reaction. A solvent or diluent is not necessary for carrying out the reaction although it may be desirable under some conditions. Solvents such as dioxane, dibutyl ether, morpholine, etc. can be used.

The optimum temperature for carrying out the reaction will vary somewhat in accordance with the particular circumstances. In general, a temperature of from about 200° C. to 400° C. will be found to give good results. The reaction is generally complete in from about ¼ hour to about 6 hours.

After completion of the initial reaction the desired product is isolated by fractional distillation. If it is desired to produce the mono-N-alkyl piperazine in a pure, anhydrous form it may be dried, for example, over solid potassium hydroxide and redistilled.

The compounds prepared by the process of the present invention are particularly useful as intermediates in the preparation of N-alkyl-N'-carbamyl piperazines described and claimed in a copending application, Serial Number 661,884, filed April 12, 1946, now Patent Number 2,467,895, which compounds have been found useful in the treatment of filariasis.

The invention will be described in greater detail in the following specific examples showing the preparation of representative alkyl piperazines. The parts are by weight unless otherwise noted.

Example 1

To a suspension of 100 parts of an alumina-nickel catalyst in 580 parts of diethanolamine in a stirring type autoclave is added 630 parts of anhydrous methylamine. The reaction mixture is heated and stirred for 3 hours at 250° C., cooled, and filtered. The filtrate is distilled and all products which distill to 136° are collected and dried over solid potassium hydroxide. The aqueous layer is separated and discarded. The dried product is redistilled and the fraction which distills to 136° C. is collected. To obtain a completely anhydrous product, the mono-N-methylpiperazine is redried over solid potassium hydroxide, and is redistilled through a fractionation column and the fraction which distills at 130°–136° C. is collected in a separate container. By drying of the forerun and subsequent redistillation an additional quantity of product with a boiling point of 130°–136° C. is obtained. The yield of crude mono-N-methylpiperazine is 88 parts.

*Example 2*

A suspension of 25 parts of Raney nickel in 150 parts of diethanolamine and 140 parts of ethylamine is shaken and heated at 225° C. for 4 hours. The catalyst is removed by filtration. The filtrate is distilled through a column packed with glass helices and after a forerun of boiling point 65°–96° C. is collected the temperature rises to 150° and the fraction boiling point 150°–156° C. is collected. The forerun may be dried over solid potassium hydroxide and redistilled to yield an additional quantity of product. A yield of 19 parts of mono-N-ethylpiperazine, boiling point 150°–156° C., is obtained.

*Example 3*

A suspension of 25 parts of an alumina-nickel catalyst in 140 parts of diethanolamine and 190 parts of isopropylamine is heated for 3 hours in an autoclave at 250° C. The catalyst is removed by filtration and the filtrate is distilled. The fraction which distills at 100°–190° C. is collected, dried over solid potassium hydroxide and redistilled. A fraction boiling point of 156°–163° C. equivalent to 24.0 parts of mono-N-isopropylpiperazine is obtained.

*Example 4*

To a solution of 144 parts of diethanolamine, 200 parts of dioxane and 100 parts of methylamine is added 25 parts of a Raney nickel catalyst. The reaction mixture is shaken and heated for 3 hours at 250° C. cooled, filtered and worked up as described in Example 1. 46 parts of mono-N-methylpiperazine is obtained.

*Example 5*

In an experiment similar to Example 4 in which 200 parts of diamylether is substituted for the dioxane, a yield of 15 parts of mono-N-methylpiperazine is obtained.

I claim:

1. A method of preparing compounds having the general formula:

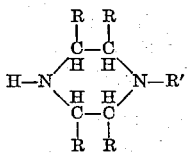

in which R is a member of the group consisting of hydrogen and lower alkyl radicals and R' is an alkyl radical which comprises heating a compound having the formula:

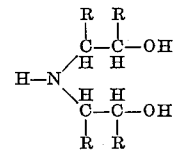

in which R is as defined above with an alkyl primary amine at a temperature of from about 200° C. to 400° C. in the presence of a dehydration catalyst selected from the group consisting of metals and metal oxide and thereafter recovering said product.

2. A method according to claim 1 characterized in that the catalyst is selected from the group consisting of alumina-nickel and Raney nickel.

3. A method according to claim 1 characterized in that the alkyl primary amine is methylamine.

4. A method of preparing mono-N-lower alkyl piperazines which comprises heating diethanolamine and a lower alkyl primary amine at a temperature of from about 200° C. to 400° C. in the presence of a dehydration catalyst selected from the group consisting of metals and metal oxides and thereafter recovering said mono-N-lower alkyl piperazine.

5. A method of preparing mono-N-methylpiperazine which comprises heating diethanolamine and methylamine at a temperature of from about 200° C. to 400° C. in the presence of alumina-nickel catalyst and recovering said mono-N-methylpiperazine therefrom.

6. A method of preparing mono-N-ethylpiperazine which comprises heating diethanolamine and ethylamine at a temperature of from about 200° C. to 400° C. in the presence of Raney nickel catalyst and recovering said mono-N-ethylpiperazine therefrom.

7. A method of preparing mono-N-isopropylpiperazine which comprises heating diethanolamine and isopropylamine at a temperature of from about 200° C. to 400° C. in the presence of alumina-nickel catalyst and thereafter recovering said mono-N-isopropylpiperazine therefrom.

KENNETH L. HOWARD.

REFERENCES CITED

The following references are of record in the file of this patent:

UNITED STATES PATENTS

| Number | Name | Date |
|---|---|---|
| 2,427,473 | Pfann | Sept. 16, 1947 |

FOREIGN PATENTS

| Number | Country | Date |
|---|---|---|
| 657,979 | Germany | Mar. 18, 1938 |

OTHER REFERENCES

Richter, Textbook of Organic Chemistry, page 228 (1938 edition).